UNITED STATES PATENT OFFICE.

LORENZ ACH, OF MANNHEIM, ALBERT ROTHMANN, OF HEIDELBERG, AND GUSTAV GIEMSA, OF HAMBURG, GERMANY, ASSIGNORS TO FARBWERKE VORM. MEISTER LUCIUS & BRUENING, OF HÖCHST-ON-THE-MAIN, GERMANY, A FIRM.

PROCESS OF PREPARING STABLE SOLUTIONS OF DI-METHYLAMINO-TETRAMINO-ARSENOBENZENE.

1,265,864.      Specification of Letters Patent.      Patented May 14, 1918.

No Drawing.      Application filed January 10, 1914. Serial No. 811,452.

*To all whom it may concern:*

Be it known that we, LORENZ ACH, ALBERT ROTHMANN, and GUSTAV GIEMSA, citizens of the German Empire, residing at Mannheim, Heidelberg, and Hamburg, Germany, respectively, have invented certain new and useful Improvements in Processes of Preparing Stable Solutions of Di-Methylamino-Tetramino-Arsenobenzene; and they do hereby declare the following to be a full, clear, and exact description of the invention, such as will enable others skilled in the art to which it appertains to make and use the same.

This invention has for its object to render di-methylamino-tetramino-arsenobenzene available for special therapeutic uses and it consists in preparing solutions of this body, these solutions being stable and permanent in the absence of oxygen.

We have made the surprising discovery that said body, di-methylamino-tetramino-arsenobenzene, whose constitutional formula is

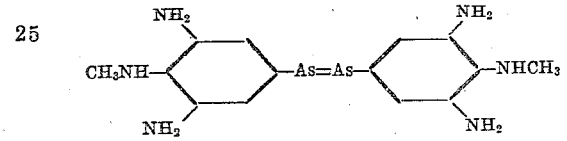

and whose properties and method of manufacture have been described in Letters Patent of the United States, No. 1,081,079, dated December 9, 1913, dissolves in aqueous solutions of bicarbonates, salts of carbamic acid being probably formed concurrently with such solution. Such a solution is obtained if the said compound is dissolved in a solution of molecularly equivalent quantity of a bicarbonate, for example, sodium bicarbonate or ammonium bicarbonate.

If, instead of starting with this basic compound, we employ one of its salts, such, for example, as its hydrochlorid, the quantities of bicarbonate to be added must evidently be correspondingly increased. In this case neutral carbonates may be employed instead of the bi-carbonates.

Another modification of the above method consists in suspending the base in water and then adding to the bath so formed an alkali, such as an aqueous solution of sodium hydrate, or of potassium hydrate, or ammonia, whereupon carbon dioxid is introduced into the bath until complete solution ensues.

The resultant solution has an approximately neutral reaction. By adding alkali or an acid thereto the free base or its salt is precipitated. By adding a suitable organic solvent, miscible with water, such as alcohol or acetone, to the solution the compound formed in said solution and which we assume to be a carbamate of sodium, potassium or other metal or radical according to the reagents employed, may be separated therefrom. These salts are yellowish brown, unstable in the air and readily soluble in water and quickly become dark when exposed to the air. They are insoluble in alcohol, acetone and ether. They decompose on heating.

The solutions obtained according to this process are of great importance for the therapeutic use of di-methylamino-tetramino-arsenobenzene. For example, they enable this remedy to be injected into the muscles without the occurrence of disagreeable attending effects such as necrosis, a result which cannot be attained when so using solutions of the alkali-compounds of other arsenobenzene derivative such for example, as the alkali compound of diamino-dioxy-arsenobenzene.

In order to fully disclose our invention the following examples which constitute what we consider the preferable manner of carrying the same into effect, are given:

Example 1.

56.8 grams of chlorid of di-methylamino-tetramino-arsenobenzene are dissolved in water and mixed with 200 cubic centimeters of a double normal solution of sodium hydrate. The base which thus forms is separated by filtration and washed with water until it is free from alkali, whereupon it is suspended in about 500 cubic centimeters of water, 276 cubic centimeters of a 3.36 per cent. solution of sodium bicarbonate being added to the suspension. In order to bring about the solution, the whole is shaken in a bottle from which the air has been expelled by the introduction of carbon dioxid. Such solution occurs in a short time. The solution when complete is filtered in the absence of air and is stored in bottles filled with carbon dioxid or nitrogen.

*Example 2.*

20 grams of chlorid of di-methylamino-tetramino-arsenobenzene are dissolved in about 250 cubic centimeters of water and the solution is then mixed with a solution of 12.8 grams of sodium bicarbonate in 200 cubic centimeters of water. This mixture is then introduced into a flask and the latter evacuated. The base which at first separates out is thus slowly brought into solution by virtue of the escape of carbon dioxid.

*Example 3.*

By substituting for the 12.8 grams of sodium bicarbonate in the above example, 8 grams of anhydrous sodium carbonate, the other steps and features of the process remaining the same, a clear solution of di-methylamino-tetramino-arsenobenzene is also obtained.

*Example 4.*

28.4 grams of chlorid of di-methylamino-tetramino-arsenobenzene are dissolved in about 500 cubic centimeters of water and the solution is then mixed with an aqueous solution of 16.62 grams of ammonium bicarbonate or of 20 grams of potassium bicarbonate, the bath being then treated as in Example 2.

*Example 5.*

The base separated from the reaction of 200 cubic centimeters of double-normal sodium hydrate solution with 56.8 grams of chlorid of di-methylamino-tetramino-arsenobenzene, according to Example 1 is suspended in about 500 cubic centimeters of water and to this bath 100 cubic centimeters of double-normal sodium hydrate solution are added, carbon dioxid being introduced into the whole until complete solution occurs.

What we claim and desire to secure by Letters Patent is:

1. The process of producing preparations useful for therapeutic purposes which consists in subjecting a substance comprising di-methylamino-tetramino-arsenobenzine to the action of a soluble carbonate in the presence of water.

2. The process of producing preparations useful for therapeutic purposes which consists in subjecting a substance comprising di-methylamino-tetramino-arsenobenzine to the action of a soluble bicarbonate in the presence of water.

3. The process of producing preparations useful for therapeutic purposes which consists in subjecting a salt of di-methylamino-tetramino-arsenobenzene to the action of a soluble carbonate in the presence of water.

4. The process of producing preparations useful for therapeutic purposes which consists in subjecting a salt of di-methylamino-tetramino-arsenobenzene to the action of a soluble bicarbonate in the presence of water.

5. As a new chemical composition, a compound resulting from the interaction of di-methylamino-tetramino-arsenobenzene and a soluble carbonate, and probably corresponding in composition to a carbamate of the metal or radical whose carbonate was employed.

6. As a new chemical composition, a solution containing di-methylamino-tetramino-arsenobenzene probably in the form of a carbamate, said solution having a yellowish color which darkens upon exposure to air, and being decomposed by treatment with hydrochloric acid with formation of di-methyl-amino-tetramino-arsenobenzene.

In testimony whereof we hereunto affix our signatures in the presence of witnesses.

LORENZ ACH.
ALBERT ROTHMANN.
GUSTAV GIEMSA.

Witnesses as to the signatures of Lorenz Ach and Albert Rothmann:
  OTTO HOFMANN,
  S. S. BERGER.

Witnesses as to the signature of Gustav Giemsa:
  ERNEST H. L. MUMMENHOFF,
  IDA HAFSMANN.